UNITED STATES PATENT OFFICE.

CHARLES CLIFTON MOORE, OF LIVERPOOL, ENGLAND.

PROCESS OF MAKING BORACIC ACID AND CHLORATES.

SPECIFICATION forming part of Letters Patent No. 650,187, dated May 22, 1900.

Application filed March 23, 1900. Serial No. 9,877. (No specimens.)

*To all whom it may concern:*

Be it known that I, CHARLES CLIFTON MOORE, a subject of the Queen of Great Britain, residing in Liverpool, in the county of Lancaster, England, (whose full postal address is 11 Old Hall street, Liverpool,) have invented certain new and useful Improvements in the Manufacture of Boracic Acid and Chlorates, (for which application has been made in England for provisional protection under No. 3,193, dated February 17, 1900,) of which the following is a specification.

The object of this invention is to effect the complete decomposition of crude commercial borates in such a manner as to avoid the loss of boracic acid, which occurs in the manufacture of borax as carried out at present, and at the same time to obtain other products of commercial value.

The crude borate of lime or of magnesia or other crude borate in a fine state of powder is suspended in water or mother-liquor from a previous operation, preferably in about the proportion of two and one-half to three pounds borate to the gallon of water, and chlorine gas is passed into the mixture, which is kept agitated. During the treatment with chlorine the mixture is preferably maintained at a temperature of from 60° to 80° centigrade. The absorption of the chlorine, which in such case is very rapid, results on completion in the whole of the combined boracic acid contained in the crude borate being set free, while the bases contained in the crude borate form chlorides and chlorates equivalent to the chlorine absorbed. The liquor obtained in this manner after settling out any insoluble residue is cooled, preferably, to about 15° to 20° centigrade, and most of the free boracic acid is thereby crystallized out. The mother-liquor from the crystallization may be used to mix with a fresh quantity of crude borate and again treated with chlorine as desired, or the mother-liquor may be concentrated by evaporation and after the separation of the crude boracic acid by cooling the residual liquor may be treated to extract the chlorate contained in it by the usual means.

Boracic acid prepared in the manner described is easily made quite pure by recrystallization, and if it be desired to prepare borax instead of boracic acid it is simply treated with a solution of caustic soda or carbonate of soda (either in the form of soda-ash or in the form of crude bicarbonate of soda, such as is obtained by the ammonia-soda process) in equivalent proportions, according to the amount of boracic acid present. The method as described may be worked advantageously in connection with an electrolytic process, producing both soda and chlorine, in which case both products could be utilized as they come from the cell. When a crude borate of lime is treated in the manner described, the chemical reactions may be represented as follows:

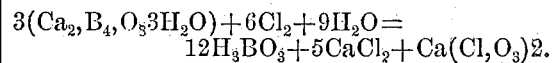

$$3(Ca_2, B_4, O_8 3H_2O) + 6Cl_2 + 9H_2O = 12H_3BO_3 + 5CaCl_2 + Ca(Cl, O_3)2.$$

The solution obtained contains boracic acid, calcium chloride, and calcium chlorate. If a borate of magnesia be substituted for that of lime, then chloride and chlorate of magnesia would obviously be obtained in the solution with the boracic acid, and so on, depending upon the bases contained in the crude material. The greater the concentration of the solution containing the chloride and chlorate the more completely will the boracic acid crystallize from the same, or the boracic acid may be removed from the solution by cooling the same to a very low temperature—say 10° (minus ten) centigrade. After the separation of the boracic acid in the manner described the residual solution containing the chloride and chlorate is treated for the extraction of chlorate in the usual way.

In case of the crude borate employed containing impurities—such as organic matter, chlorides, sulphates, or soluble silica—the presence of all or any of these does not affect the progress of the reaction or the separation of the boracic acid. Any organic matter is destroyed by the chlorine, while the sulphate is converted into sulphate of lime, (provided that calcium salts are present,) which is practically insoluble in the hot solution of calcium or magnesium chloride and chlorate. Any chloride contained in the crude borate would obviously remain dissolved in the mother-liquor. In this respect the method is not in the least affected in dealing with very impure crude borates, which offer such great difficulties when dealt with by the present process of manufacture.

I claim as my invention—

1. The process of producing boracic acid from crude borates which consists in suspending the finely-ground crude borate in water, and passing chlorine into the mixture, substantially as described.

2. The process of separating boracic acid from crude borates, which consists in suspending the finely-divided crude borate in water, passing chlorine into the mixture and precipitating the boracic acid by refrigeration.

3. The process of separating boracic acid from crude borates, which consists in suspending the finely-divided crude borate in water, passing chlorine into the mixture precipitating the boracic acid by refrigeration, and mixing the mother-liquor with a fresh quantity of crude borate for a fresh cycle of operations.

4. The improvement in the process of obtaining chlorate which consists in suspending finely-ground crude borates in water and passing in chlorine with agitation, separating the boracic acid, and then extracting the chlorate in any usual manner.

In witness whereof I have hereunto signed my name, this 8th day of March, 1900, in the presence of two subscribing witnesses.

CHARLES CLIFTON MOORE.

Witnesses:
 ALBERT C. B. HENRI,
 JOHN McLACHLAN.